(12) United States Patent
Dalal

(10) Patent No.: US 9,495,308 B2
(45) Date of Patent: Nov. 15, 2016

(54) OFFLOADING OF COMPUTATION FOR RACK LEVEL SERVERS AND CORRESPONDING METHODS AND SYSTEMS

(71) Applicant: Xockets IP, LLC, Wilmington, DE (US)

(72) Inventor: Parin Bhadrik Dalal, Milpitas, CA (US)

(73) Assignee: Xockets, Inc., San Jose, CA (US)

( * ) Notice: Subject to any disclaimer, the term of this patent is extended or adjusted under 35 U.S.C. 154(b) by 191 days.

(21) Appl. No.: 13/900,251

(22) Filed: May 22, 2013

(65) Prior Publication Data

US 2013/0318275 A1    Nov. 28, 2013

Related U.S. Application Data

(60) Provisional application No. 61/650,373, filed on May 22, 2012.

(51) Int. Cl.
| | | |
|---|---|---|
| G06F 13/16 | (2006.01) | |
| G06F 12/10 | (2016.01) | |
| G06F 9/50 | (2006.01) | |

(52) U.S. Cl.
CPC .......... *G06F 13/16* (2013.01); *G06F 13/1652* (2013.01); *G06F 9/5066* (2013.01); *G06F 12/1081* (2013.01); *Y02B 60/1225* (2013.01); *Y02B 60/1228* (2013.01); *Y02B 60/142* (2013.01); *Y02B 60/167* (2013.01)

(58) Field of Classification Search
CPC ....................... G06F 13/16; G06F 13/14; G06F 13/1652; G06F 13/20; G06F 13/38
See application file for complete search history.

(56) References Cited

U.S. PATENT DOCUMENTS

| | | | |
|---|---|---|---|
| 4,894,768 A * | 1/1990 | Iwasaki et al. | ................. 712/34 |
| 5,237,662 A | 8/1993 | Green et al. | |
| 5,247,675 A | 9/1993 | Farrell et al. | |
| 5,577,213 A | 11/1996 | Avery et al. | |
| 5,870,350 A | 2/1999 | Bertin et al. | |
| 6,092,146 A | 7/2000 | Dell et al. | |
| 6,157,955 A | 12/2000 | Narad et al. | |
| 6,330,658 B1 | 12/2001 | Evoy et al. | |
| 6,751,113 B2 | 6/2004 | Bhakta et al. | |

(Continued)

FOREIGN PATENT DOCUMENTS

| | | |
|---|---|---|
| WO | 2011120019 A2 | 9/2011 |
| WO | 2012141694 A1 | 10/2012 |

OTHER PUBLICATIONS

Tanabe, Noburo, et al. Preliminary Evaluations of a FPGA-based-Prototype of DIMMnet-2 Network Interface. Proceedings of the Innovative Architecture for Future Generation High-Performance Processors and Systems (IWIA '05). 2005. IEEE.*

(Continued)

*Primary Examiner* — Thomas J Cleary

(57) ABSTRACT

A method is disclosed that includes writing data to predetermined physical addresses of a system memory, the data including metadata that identifies a processing type; configuring a processor module to include the predetermined physical addresses, the processor module being physically connected to the memory bus by a memory module connection; and processing the write data according to the processing type with an offload processor mounted on the processor module.

14 Claims, 3 Drawing Sheets

(56) References Cited

U.S. PATENT DOCUMENTS

| | | |
|---|---|---|
| 6,810,442 B1 | 10/2004 | Lin et al. |
| 6,873,534 B2 | 3/2005 | Bhakta et al. |
| 6,877,076 B1 | 4/2005 | Cho et al. |
| 6,930,900 B2 | 8/2005 | Bhakta et al. |
| 6,930,903 B2 | 8/2005 | Bhakta et al. |
| 7,062,618 B2 | 6/2006 | Tsunoda et al. |
| 7,089,412 B2 | 8/2006 | Chen |
| 7,254,036 B2 | 8/2007 | Pauley et al. |
| 7,286,436 B2 | 10/2007 | Bhakta et al. |
| 7,289,386 B2 | 10/2007 | Bhakta et al. |
| 7,305,574 B2 | 12/2007 | Ferraiolo et al. |
| 7,375,970 B2 | 5/2008 | Pauley et al. |
| 7,421,552 B2 | 9/2008 | Long |
| 7,442,050 B1 | 10/2008 | Bhakta et al. |
| 7,454,749 B2 | 11/2008 | Oberdorfer |
| 7,467,251 B2 | 12/2008 | Park et al. |
| 7,472,205 B2 | 12/2008 | Abe |
| 7,480,611 B2 | 1/2009 | Gooding et al. |
| 7,532,537 B2 | 5/2009 | Solomon et al. |
| 7,565,461 B2 * | 7/2009 | Huppenthal et al. ........... 710/22 |
| 7,619,893 B1 | 11/2009 | Yu |
| 7,619,912 B2 | 11/2009 | Bhakta et al. |
| 7,636,274 B2 | 12/2009 | Solomon et al. |
| 7,716,035 B2 | 5/2010 | Oshins et al. |
| 7,716,411 B2 | 5/2010 | Panabaker et al. |
| 7,811,097 B1 | 10/2010 | Bhakta et al. |
| 7,839,645 B2 | 11/2010 | Pauley et al. |
| 7,840,748 B2 | 11/2010 | Gower et al. |
| 7,864,627 B2 | 1/2011 | Bhakta et al. |
| 7,881,150 B2 | 2/2011 | Solomon et al. |
| 7,886,103 B2 * | 2/2011 | Nishtala et al. ............. 710/301 |
| 7,904,688 B1 | 3/2011 | Kuo et al. |
| 7,916,574 B1 | 3/2011 | Solomon et al. |
| 8,001,434 B1 | 8/2011 | Lee et al. |
| 8,033,836 B1 | 10/2011 | Bhakta et al. |
| 8,054,832 B1 | 11/2011 | Shukla et al. |
| 8,072,837 B1 | 12/2011 | Solomon et al. |
| 8,081,535 B2 | 12/2011 | Bhakta et al. |
| 8,081,536 B1 | 12/2011 | Solomon et al. |
| 8,081,537 B1 | 12/2011 | Bhakta et al. |
| 8,117,369 B2 | 2/2012 | Nishtala et al. |
| 8,154,901 B1 | 4/2012 | Lee et al. |
| 8,190,699 B2 | 5/2012 | Mcmillian et al. |
| 8,264,903 B1 | 9/2012 | Lee et al. |
| 8,287,291 B1 | 10/2012 | Bhakta et al. |
| 8,301,833 B1 | 10/2012 | Chen et al. |
| 8,347,005 B2 | 1/2013 | Bresniker |
| 8,359,501 B1 | 1/2013 | Lee et al. |
| 8,417,870 B2 | 4/2013 | Lee et al. |
| 8,447,957 B1 * | 5/2013 | Carrillo et al. ............... 712/225 |
| 8,489,837 B1 | 7/2013 | Lee |
| 8,516,185 B2 | 8/2013 | Lee et al. |
| 8,516,187 B2 | 8/2013 | Chen et al. |
| 8,516,188 B1 | 8/2013 | Solomon et al. |
| 8,553,470 B2 | 10/2013 | Lee et al. |
| 8,555,002 B2 | 10/2013 | Karamcheti et al. |
| 8,599,634 B1 | 12/2013 | Lee et al. |
| 8,631,193 B2 | 1/2014 | Smith et al. |
| 8,656,072 B2 | 2/2014 | Hinkle et al. |
| 8,689,064 B1 | 4/2014 | Lee et al. |
| 8,756,364 B1 | 6/2014 | Bhakta et al. |
| 8,775,858 B2 | 7/2014 | Gower et al. |
| 8,782,350 B2 | 7/2014 | Lee et al. |
| 8,782,373 B2 | 7/2014 | Karamcheti et al. |
| 8,787,060 B2 | 7/2014 | Lee |
| 8,864,500 B1 | 10/2014 | Bhakta et al. |
| 8,868,829 B2 | 10/2014 | Rajan et al. |
| 8,874,831 B2 | 10/2014 | Lee et al. |
| 8,874,843 B2 | 10/2014 | Okin et al. |
| 8,881,389 B2 | 11/2014 | Kanapathippillai et al. |
| 8,904,098 B2 | 12/2014 | Amidi et al. |
| 8,924,680 B2 | 12/2014 | Perego et al. |
| 8,930,647 B1 | 1/2015 | Smith |
| 8,943,245 B2 | 1/2015 | Karamcheti et al. |
| 2002/0181450 A1 | 12/2002 | Sokol et al. |
| 2004/0093477 A1 | 5/2004 | Oberdorfer |
| 2004/0148420 A1 | 7/2004 | Hinshaw et al. |
| 2004/0160446 A1 * | 8/2004 | Gosalia et al. ............... 345/503 |
| 2004/0187122 A1 * | 9/2004 | Gosalia et al. ............... 718/100 |
| 2004/0202319 A1 | 10/2004 | Hussain et al. |
| 2005/0018495 A1 | 1/2005 | Bhakta et al. |
| 2005/0120160 A1 | 6/2005 | Plouffe et al. |
| 2005/0226238 A1 | 10/2005 | Hoskote et al. |
| 2005/0240745 A1 | 10/2005 | Iyer et al. |
| 2005/0283546 A1 * | 12/2005 | Huppenthal et al. ........... 710/36 |
| 2006/0004965 A1 | 1/2006 | Tu et al. |
| 2007/0079185 A1 | 4/2007 | Totolos |
| 2007/0124532 A1 | 5/2007 | Bennett |
| 2007/0150671 A1 * | 6/2007 | Kurland ........................ 711/154 |
| 2007/0226745 A1 | 9/2007 | Haas et al. |
| 2007/0255776 A1 * | 11/2007 | Iwai ............................. 708/200 |
| 2007/0299990 A1 | 12/2007 | Ben-yehuda et al. |
| 2008/0040551 A1 | 2/2008 | Gray et al. |
| 2008/0229049 A1 | 9/2008 | Nanda et al. |
| 2008/0259555 A1 | 10/2008 | Bechtolsheim et al. |
| 2008/0304481 A1 | 12/2008 | Gurney et al. |
| 2009/0138440 A1 | 5/2009 | Goyal |
| 2009/0187713 A1 | 7/2009 | Zedlewski et al. |
| 2009/0201711 A1 | 8/2009 | Solomon et al. |
| 2010/0064099 A1 * | 3/2010 | Nishtala et al. ............... 711/105 |
| 2010/0091540 A1 | 4/2010 | Bhakta et al. |
| 2010/0110642 A1 | 5/2010 | Pauley et al. |
| 2010/0128507 A1 | 5/2010 | Solomon et al. |
| 2010/0183033 A1 | 7/2010 | Hannuksela |
| 2011/0016250 A1 | 1/2011 | Lee et al. |
| 2011/0022818 A1 | 1/2011 | Kegel et al. |
| 2011/0085406 A1 | 4/2011 | Solomon et al. |
| 2011/0090749 A1 | 4/2011 | Bhakta et al. |
| 2011/0099317 A1 * | 4/2011 | Nishtala et al. ............... 710/316 |
| 2011/0110376 A1 | 5/2011 | Jiang |
| 2011/0154318 A1 | 6/2011 | Oshins et al. |
| 2011/0202679 A1 | 8/2011 | Cohen et al. |
| 2011/0211444 A1 | 9/2011 | Das et al. |
| 2011/0235260 A1 | 9/2011 | Lee et al. |
| 2011/0296440 A1 | 12/2011 | Laurich et al. |
| 2012/0027018 A1 | 2/2012 | Ilyadis |
| 2012/0047126 A1 | 2/2012 | Branscome et al. |
| 2012/0079209 A1 | 3/2012 | Zhou et al. |
| 2012/0079352 A1 | 3/2012 | Frost et al. |
| 2012/0106228 A1 | 5/2012 | Lee |
| 2012/0239874 A1 | 9/2012 | Lee et al. |
| 2012/0250386 A1 | 10/2012 | Lee et al. |
| 2012/0250682 A1 | 10/2012 | Vincent et al. |
| 2012/0271990 A1 | 10/2012 | Chen et al. |
| 2012/0331268 A1 | 12/2012 | Konig et al. |
| 2013/0003556 A1 | 1/2013 | Boden et al. |
| 2013/0019057 A1 | 1/2013 | Stephens |
| 2013/0019076 A1 | 1/2013 | Amidi et al. |
| 2013/0039128 A1 | 2/2013 | Amidi et al. |
| 2013/0086309 A1 | 4/2013 | Lee et al. |
| 2013/0132639 A1 | 5/2013 | Amidi et al. |
| 2013/0262739 A1 | 10/2013 | Bennett et al. |
| 2014/0040568 A1 | 2/2014 | Lee et al. |
| 2014/0040569 A1 | 2/2014 | Solomon et al. |
| 2014/0075106 A1 | 3/2014 | Okin et al. |
| 2014/0204099 A1 * | 7/2014 | Ye ................................ 345/503 |
| 2014/0281661 A1 | 9/2014 | Milton et al. |
| 2014/0337539 A1 | 11/2014 | Lee et al. |
| 2015/0070959 A1 | 3/2015 | Lee |

OTHER PUBLICATIONS

Miyashiro, Tomotaka, et al. "DIMMNET-2: A Reconfigurable Board Connected Intor a Memory Slot". 2006. IEEE.*

Tanabe, Noboru, et al. "Prototyping on Using a DIMM Slot as a High-performance I/O Interface". Proceedings of the Innovative Architecture for Future Generation High-Performance Processors and Systems (IWIA '03). 2003. IEEE.*

Plessl, Christian, et al. "TKDM—A Reconfigurable Co-processor in a PC's Memory Slot". Proceedings of 2003 IEEE International Conference on Field-Programmable Technology (FPT). Dec. 15-17, 2003. IEEE. pp. 252-259.*

(56) References Cited

OTHER PUBLICATIONS

Tong, Dennis Ka Yau, et al. "A System Level Implementation of Rijndael on a Memory-slot based FPGA Card". Proceedings of 2002 IEEE International Conference on Field-Programmable Technology (FPT). Dec. 16-18, 2002. IEEE. pp. 102-109.*
Leong, P.H.W., et al. "Pilchard—a reconfigurable computing platform with memory slot interface". The 9$^{th}$ Annual IEEE Symposium on Field-Programmable Custom Computing Machines (FCCM'01). 2001. IEEE.*
PCT International Search Report for International Application PCT/US2013/042284, dated Nov. 26, 2013.
PCT Written Opinion of the International Search Authority for International Application PCT/US2013/042284, dated Nov. 26, 2013.
PCT International Search Report for International Application PCT/US2013/042279, dated Jan. 22, 2014.
PCT Written Opinion of the International Search Authority for International Application PCT/US2013/042279, dated Jan. 22, 2014.
PCT International Search Report for International Application PCT/US2013/042274, dated Dec. 6, 2013.
PCT Written Opinion of the International Search Authority for International Application PCT/US2013/042274, dated Dec. 6, 2013.
PCT International Search Report for International Application PCT/US2013/047217, dated Jan. 29, 2014.
PCT Written Opinion of the International Search Authority for International Application PCT/US2013/047217, dated Jan. 29, 2014.
PCT International Search Report for International Application PCT/US2013/046417, dated Dec. 23, 2013.
PCT Written Opinion of the International Search Authority for International Application PCT/US2013/046417, dated Dec. 23, 2013.
PCT International Search Report for International Application PCT/US2013/044856, dated Feb. 10, 2014.
PCT Written Opinion of the International Search Authority for International Application PCT/US2013/044856, dated Feb. 10, 2014.
PCT International Search Report for International Application PCT/US2013/044857, dated Feb. 10, 2014.
PCT Written Opinion of the International Search Authority for International Application PCT/US2013/044857, dated Feb. 10, 2014.
PCT International Search Report for International Application PCT/US2013/048013, dated Jan. 17, 2014.
PCT Written Opinion of the International Search Authority for International Application PCT/US2013/048013, dated Jan. 17, 2014.
PCT International Search Report for International Application PCT/US2013/047205, dated Sep. 24, 2013.
PCT Written Opinion of the International Search Authority for International Application PCT/US2013/047205, dated Sep. 24, 2013.
Office Action, dated Apr. 15, 2015, for U.S. Appl. No. 13/899,563.
Office Action, dated May 4, 2015, for U.S. Appl. No. 13/913,407.
Office Action, dated May 21, 2015, for U.S. Appl. No. 13/913,409.
Office Action, dated May 21, 2015, for U.S. Appl. No. 13/913,410.
Office Action, dated Jun. 5, 2015, for U.S. Appl. No. 13/913,411.
Office Action, dated Jul. 8, 2015, for U.S. Appl. No. 13/900,241.
Office Action, dated May 21, 2015, for U.S. Appl. No. 13/900,262.
Office Action, dated May 22, 2015, for U.S. Appl. No. 13/900,273.

* cited by examiner

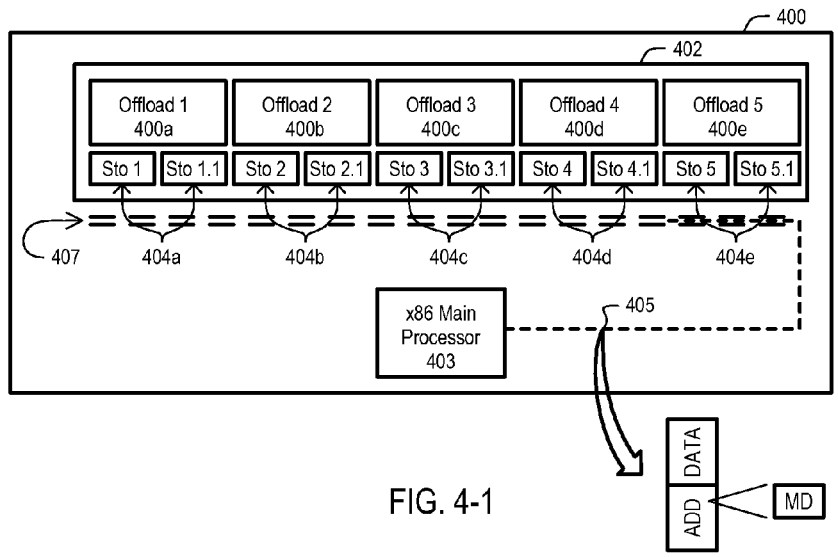
FIG. 4-1
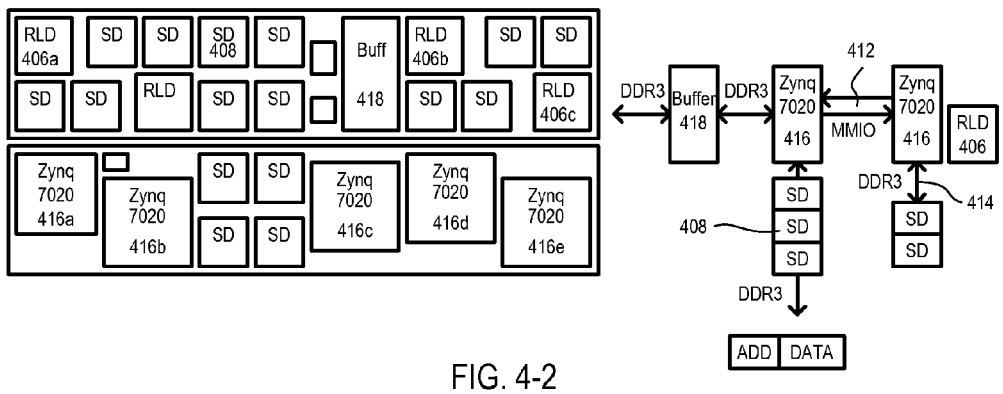
FIG. 4-2
| Systems | x86 | ARM | DIMMs | NICs |
|---|---|---|---|---|
| Xockets MAX 1U | 2x Opteron 4256 EE, 1.8GhZ/8MB | 80x A9, 800MHz, 1MB | 8 x 8GB | 4 x 40 Gbps |
| Xockets MIN 1U | 2x Opteron 4256 EE, 1.8GhZ/8MB | 20x A9, 800MHz, 1MB | 14 x 8GB | 2 x 10 Gbps |
| Reference 1U | 2x Xeon E31280, 3.3GhZ/8MB | | 18 x 8GB | 2 x 10 Gbps |
| Xockets MAX 2U | 4x Opteron 4256 EE, 1.8GhZ/8MB | 160x A9, 800MHz, 1MB | 16 x 8GB | 4 x 80 Gbps |
| Reference 2U | 4x Xeon E31280, 3.3GhZ/8MB | | 32 x 8GB | 4 x 20 Gbps |
FIG. 4-3

| Component | Av. Power (W) | Max. Power (W) | Qty. | Av. Total (W) | Total (W) |
|---|---|---|---|---|---|
| RLDRAM3, 667 MHz 576MB | 0.7 | 1.2 | 4 | 2.8 | 4.8 |
| Zynq 7020 800 MHz | 1.5 | 2.5 | 4 | 6 | 10 |
| Zynq 7020 800 MHz (arb) | 1.3 | 2.1 | 1 | 1.3 | 2.1 |
| Inphi iMB2 | 0.8 | 1.2 | 1 | 0.8 | 2.9 |
| Other | | | | 2.9 | 2.1 |
| Total Power Budget at maximum 24 Gbps ingress and 24 Gbps egress per DIMM | | | | 13.8 | 21 |

OFFLOADING OF COMPUTATION FOR RACK LEVEL SERVERS AND CORRESPONDING METHODS AND SYSTEMS

PRIORITY CLAIMS

This application claims the benefit of U.S. Provisional Patent Application 61/650,373 filed May 22, 2012, the contents of which are incorporated by reference herein.

TECHNICAL FIELD

The present disclosure relates generally to servers, and more particularly to offload or auxiliary processing modules that can be physically connected to a system memory bus to process data independent of a host processor of the server.

BACKGROUND

Networked applications often run on dedicated servers that support an associated "state" for context or session-defined application. Servers can run multiple applications, each associated with a specific state running on the server. Common server applications include an Apache web server, a MySQL database application, PHP hypertext preprocessing, video or audio processing with Kaltura supported software, packet filters, application cache, management and application switches, accounting, analytics, and logging.

Unfortunately, servers can be limited by computational and memory storage costs associated with switching between applications. When multiple applications are constantly required to be available, the overhead associated with storing the session state of each application can result in poor performance due to constant switching between applications. Dividing applications between multiple processor cores can help alleviate the application switching problem, but does not eliminate it, since even advanced processors often only have eight to sixteen cores, while hundreds of application or session states may be required.

SUMMARY

A method can include writing data to predetermined physical addresses of a system memory, the data including metadata that identifies a processing type; configuring a processor module to include the predetermined physical addresses, the processor module being physically connected to the memory bus by a memory module connection; and processing the write data according to the processing type with an offload processor mounted on the processor module.

Another method can include receiving write data over a system memory bus via an in-line module connector, the write data including a metadata portion identifying a processing to be performed on at least a portion of the write data; performing the processing on at least a portion of the write data with at least one offload processor mounted on a module having the in-line module connector to generate processed data; and transmitting the processed data over the memory bus; wherein the system memory bus is further connected to at least one processor connector configured to receive at least one host processor different from the at least one offload processor.

BRIEF DESCRIPTION OF THE DRAWINGS

FIG. 4-1 shows a cartoon schematically illustrating a data processing system according to an embodiment, including a removable computation module for offload of data processing.

FIG. 4-2 shows an example layout of an in-line module (referred to as a "XIMM") module according to an embodiment.

FIG. 4-3 shows two possible architectures for a data processing system including x86 main processors and XIMMs (Xockets MAX and MIN).

FIG. 4-4 shows a representative the power budget for XIMMs according to various embodiments.

FIG. 4-5 illustrates data flow operations of one embodiment using an ARM A9 architecture according to an embodiment.

DETAILED DESCRIPTION

Figure 1:
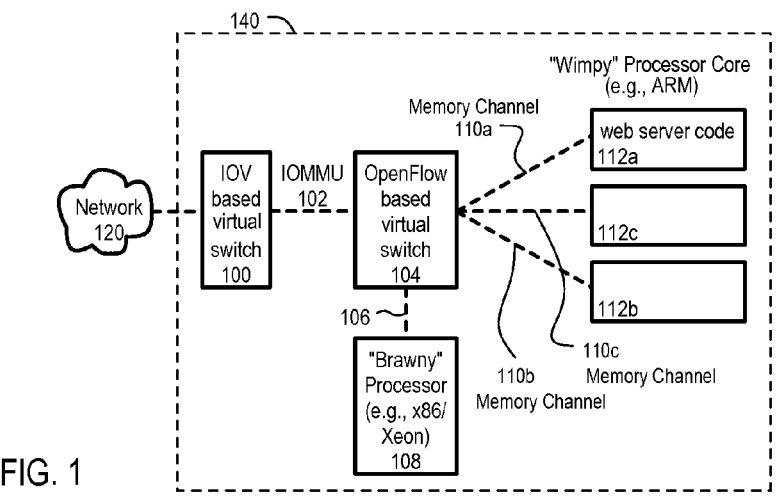
FIG. 1 shows illustrates an embodiment with a group of web servers that are partitioned across a group of brawny processor core(s) and a set of wimpy cores housed in a rack server.

Networked applications are available that run on servers and have associated with them a state (session-defined applications). The session nature of such applications allows them to have an associated state and a context when the session is running on the server. Further, if such session-limited applications are computationally lightweight, they can be run in part or fully on the auxiliary or additional processor cores (such as those based on the ARM architecture, as but one particular example) which are mounted on modules connected to a memory bus, for example, by insertion into a socket for a Dual In-line Memory Module (DIMM). Such a module can be referred to as a Xocket™ In-line Memory Module (XIMM), and have multiple cores (e.g., ARM cores) associated with a memory channel. A XIMM can access the network data through an intermediary virtual switch (such as OpenFlow or similar) that can identify sessions and direct the network data to the corresponding module (XIMM) mounted cores, where the session flow for the incoming network data can be handled.

As will be appreciated, through usage of a large prefetch buffer or low latency memory, the session context of each of the sessions that are run on the processor cores of a XIMM can be stored external to the cache of such processor cores. By systematically engineering the transfer of cache context to a memory external to the module processors (e.g., RAMs) and engineering low latency context switch, it is possible to execute several high-bandwidth server applications on a XIMM provided the applications are not computationally intensive. The "wimpy" processor cores of a XIMM can be favorably disposed to handle high network bandwidth traffic at a lower latency and at a very low power when compared to traditional high power 'brawny' cores.

In effect, one can reduce problems associated with session limited servers by using the module processor (e.g., an ARM architecture processor) of a XIMM to offload part of the functionality of traditional servers. Module processor cores may be suited to carry computationally simple or light-weight applications such as packet filtering or packet logging functions. They may also be suited for providing the function of an application cache for handling hot-code that is to be serviced very frequently to incoming streams.

Module processor cores can also be suited for functions such as video streaming/real time streaming, that often only require light-weight processing.

As an example of partitioning applications between a XIMM with "wimpy" ARM cores and a conventional "brawny" core (e.g., x86 or Itanium server processor with Intel multicore processor), a computationally lightweight Apache web server can be hosted on one or more XIMMs with ARM cores, while computationally heavy MySQL and PHP are hosted on x86 brawny cores. Similarly, lightweight applications such as a packet filter, application cache, management and application switch are hosted on XIMM(s), while x86 cores host control, accounting, analytics and logging.

FIG. 1 illustrates an embodiment with a group of distributed web servers that are partitioned across a group of brawny processor core(s) 108 connected by bus 106 to switch 104 (which may be an OpenFlow or other virtual switch) and a set of wimpy XIMM mounted cores (112a to 112c), all being housed in a rack server module 140. In some embodiments, a rack server module 140 further includes a switch (100), which can be a network interface card with single root 10 virtualization that provides input-out memory management unit (IOMMU) functions 102. A second virtual switch (104) running, for example, an open source software stack including OpenFlow can redirect packets to XIMM mounted cores (112a to 112c).

According to some embodiments, a web server running Apache-MySQL-PHP (AMP) can be used to service clients that send requests to the server module 140 from network 120. The embodiment of FIG. 1 can split a traditional server module running AMP across a combination of processors cores, which act as separate processing entities. Each of the wimpy processor cores (112a to 112c) (which can be low power ARM cores in particular embodiments) can be mounted on an XIMM, with each core being allocated a memory channel (110a, 110b, 110c). At least of one of the wimpy processor cores (112a to 112c) can be capable of running a computationally light weight Apache or similar web server code for servicing client requests which are in the form of HTTP or a similar application level protocol. The Apache server code can be replicated for a plurality of clients to service a huge number of requests. The wimpy cores (112a to 112c) can be ideally suited for running such Apache code and responding to multiple client requests at a low latency. For static data that is available locally, wimpy cores (112a to 112c) can lookup such data from their local cache or a low latency memory associated with them. In case the queried data is not available locally, the wimpy cores (112a to 112c) can request a direct memory access (DMA) (memory-to-memory or disk-to-memory) transfer to acquire such data.

The computation and dynamic behavior associated with the web pages can be rendered by PHP or such other server side scripts running on the brawny cores 108. The brawny cores might also have code/scripting libraries for interacting with MySQL databases stored in hard disks present in said server module 140. The wimpy cores (112a to 112c), on receiving queries or user requests from clients, transfer embedded PHP/MySQL queries to said brawny cores over a connection (e.g., an Ethernet-type connection) that is tunneled on a memory bus such as a DDR bus. The PHP interpreter on brawny cores 108 interfaces and queries a MySQL database and processes the queries before transferring the results to the wimpy cores (112a to 112c) over said connection. The wimpy cores (112a to 112c) can then service the results obtained to the end user or client.

Given that the server code lacking server side script is computationally light weight, and many Web API types are Representational State Transfer (REST) based and require only HTML processing, and on most occasions require no persistent state, wimpy cores (112a to 112c) can be highly suited to execute such light weight functions. When scripts and computation is required, the computation is handled favorably by brawny cores 108 before the results are serviced to end users. The ability to service low computation user queries with a low latency, and the ability to introduce dynamicity into the web page by supporting server-side scripting make the combination of wimpy and brawny cores an ideal fit for traditional web server functions. In the enterprise and private datacenter, simple object access protocol (SOAP) is often used, making the ability to context switch with sessions performance critical, and the ability of wimpy cores to save the context in an extended cache can enhance performance significantly.

Figure 2:
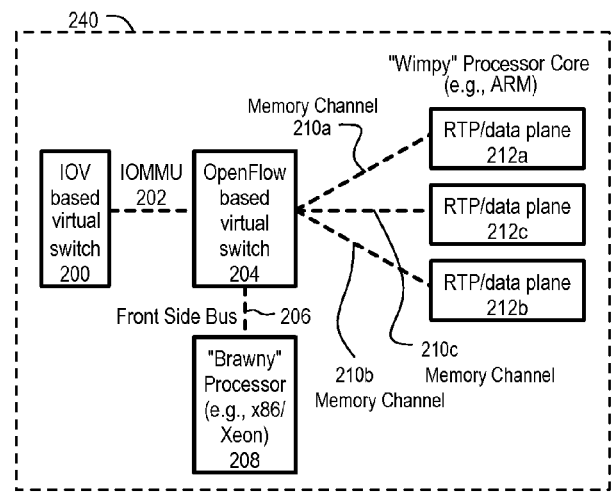
FIG. 2 shows an embodiment with an assembly that is favorably suited for handling real time traffic such as video streaming.

FIG. 2 illustrates an embodiment with an assembly that is favorably suited for handling real time traffic such as video streaming. The assembly comprises of a group of web servers that are partitioned across a group of brawny processor core(s) 208 and a set of wimpy cores (212a to 212c) housed in a rack server module 240. The embodiment of FIG. 2 splits a traditional server module capable of handling real time traffic across a combination of processors cores, which act as separate processing entities. In some embodiments, a rack server module 240 further includes a switch (100), which can provide input-out memory management unit (IOMMU) functions 102.

Each of the wimpy processor cores (e.g., ARM cores) (212a to 212c) can be mounted on an in-memory module (not shown) and each of them can be allocated a memory channel (210a to 210c). At least one of the wimpy processor cores (212a to 212c) can be capable of running a tight, computationally light weight web server code for servicing applications that need to be transmitted with a very low latency/jitter. Example applications such as video, audio, or voice over IP (VoIP) streaming involve client requests that need to be handled with as little latency as possible. One particular protocol suitable for the disclosed embodiment is Real-Time Transport Protocol (RTP), an Internet protocol for transmitting real-time data such as audio and video. RTP itself does not guarantee real-time delivery of data, but it does provide mechanisms for the sending and receiving applications to support streaming data.

Brawny processor core(s) 208 can be connected by bus 206 to switch 204 (which may be an OpenFlow or other virtual switch). In one embodiment, such a bus 206 can be a front side bus.

In operation, server module 240 can handle several client requests and services information in real time. The stateful nature of applications such as RTP/video streaming makes the embodiment amenable to handle several queries at a very high throughput. The embodiment can have an engineered low latency context overhead system that enables wimpy cores (212a to 212c) to shift from servicing one session to another session in real time. Such a context switch system can enable it to meet the quality of service (QoS) and jitter requirements of RTP and video traffic. This can provide substantial performance improvement if the overlay control plane and data plane (for handling real time applications related traffic) is split across a brawny processor 208 and a number of wimpy cores (212a to 212c). The wimpy cores (212a to 212c) can be favorably suited to handling the data plane and servicing the actual streaming of data in video/audio streaming or RTP applications. The ability of wimpy cores (212a to 212c) to switch between multiple sessions with low latency makes them suitable for handling of the data plane.

For example, wimpy cores (212a to 212c) can run code that quickly constructs data that is in an RTP format by concatenating data (that is available locally or through direct memory access (DMA) from main memory or a hard disk) with sequence number, synchronization data, timestamp etc., and sends it over to clients according to a predetermined protocol. The wimpy cores (212a to 212c) can be capable of switching to a new session/new client with a very low latency and performing a RTP data transport for the new session. The brawny cores 208 can be favorably suited for overlay control plane functionality.

The overlay control plane can often involve computationally expensive actions such as setting up a session, monitoring session statistics, and providing information on QoS and feedback to session participants. The overlay control plane and the data plane can communicate over a connection (e.g., an Ethernet-type connection) that is tunneled on a memory bus such as a DDR bus. Typically, overlay control can establish sessions for features such as audio/videoconferencing, interactive gaming, and call forwarding to be deployed over IP networks, including traditional telephony features such as personal mobility, time-of-day routing and call forwarding based on the geographical location of the person being called. For example, the overlay control plane can be responsible for executing RTP control protocol (RTCP, which forms part of the RTP protocol used to carry VoIP communications and monitors QoS); Session Initiation Protocol (SIP, which is an application-layer control signaling protocol for Internet Telephony); Session Description Protocol (SDP, which is a protocol that defines a text-based format for describing streaming media sessions and multicast transmissions); or other low latency data streaming protocols.

Figure 3:
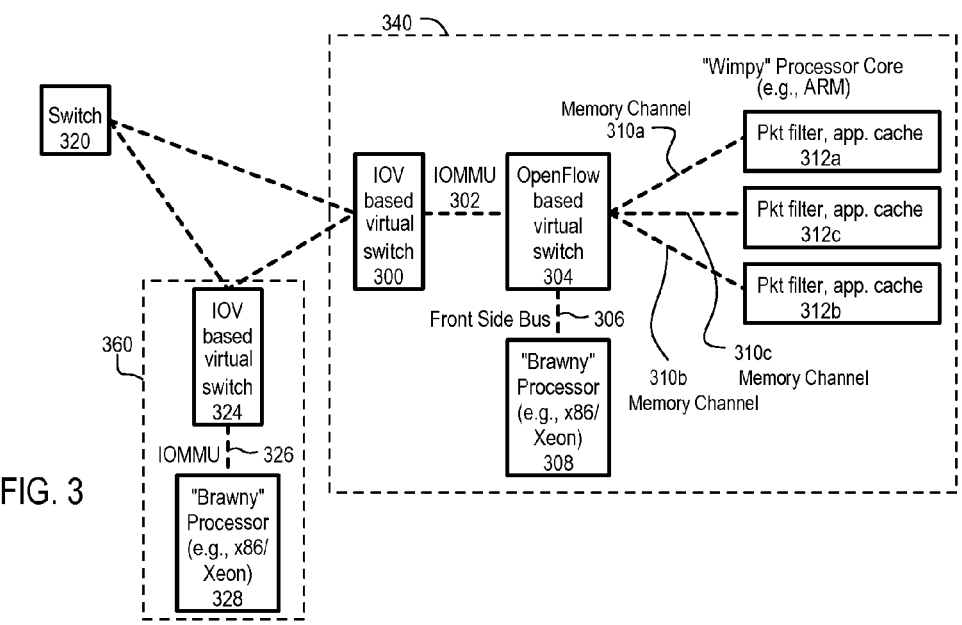
FIG. 3 shows illustrates an embodiment with a proxy server—web server assembly that is partitioned across a group of brawny processor core(s) (housed in a traditional server module) and a set of wimpy cores housed in a rack server module.

FIG. 3 illustrates an embodiment with a proxy server—web server assembly that is partitioned across a group of brawny processor core(s) 328 (housed in a traditional server module 360) and a set of wimpy cores (312a to 312c) housed in a rack server module 340. The embodiment can include a proxy server module 340 that can handle content that is frequently accessed. A switch/load balancer apparatus 320 can direct all incoming queries to the proxy server module 340. The proxy server module 340 can look up its local memory for frequently accessed data and responds to the query with a response if such data is available. The proxy server module 340 can also store server side code that is frequently accessed and can act as a processing resource for executing the hot code. For queries that are not part of the rack hot code, the wimpy cores (312a to 312c) can redirect the traffic to brawny cores (308, 328) for processing and response.

In particular embodiments, in some embodiments, a rack server module 240 further includes a switch (300), which can provide input-out memory management unit (IOMMU) functions 302 and a switch 304 (which may be an OpenFlow or other virtual switch). Brawny processor core(s) 308 can be connected to switch 304 by bus 306, which can be a front side bus. A traditional server module 360 can also include a switch 324 can provide IOMMU functions 326.

The following example(s) provide illustration and discussion of exemplary hardware and data processing systems suitable for implementation and operation of the foregoing discussed systems and methods. In particular hardware and operation of wimpy cores or computational elements connected to a memory bus and mounted in DIMM or other conventional memory socket is discussed.

Figures 4, 5:
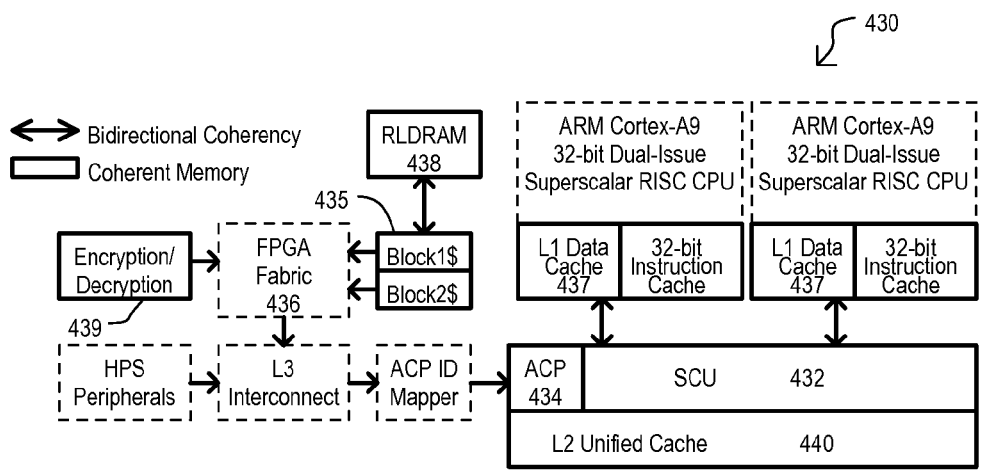

FIG. 4-1 is a cartoon schematically illustrating a data processing system 400 including a removable computation module 402 for offload of data processing from x86 or similar main/server processors 403 to modules connected to a memory bus 403. Such modules 402 can be XIMM modules, as described herein or equivalents, and can have multiple computation elements that can be referred to as "offload processors" because they offload various "light touch" processing tasks such HTML, video, packet level services, security, or data analytics. This is of particular advantage for applications that require frequent random access or application context switching, since many server processors incur significant power usage or have data throughput limitations that can be greatly reduced by transfer of the computation to lower power and more memory efficient offload processors.

The computation elements of offload processors can be accessible through memory bus 405 as memory mapped hardware. In this embodiment, the module can be inserted into a Dual Inline Memory Module (DIMM) slot on a commodity computer or server using a DIMM connector (407), providing a significant increase in effective computing power to system 400. The module (e.g., XIMM) may communicate with other components in the commodity computer or server via one of a variety of busses including but not limited to any version of existing double data rate standards (e.g., DDR, DDR2, DDR3, etc.) as so can include address lines (ADD) and data lines (DATA). In operation, at least a portion (MD) of an address on address lines (ADD) can identifies a processing to be performed on write data sent to the module 402.

This illustrated embodiment of the module 402 contains five offload processors (400a, 400b, 400c, 400d, 400e) however other embodiments containing greater or fewer numbers of processors are contemplated. The offload processors (400a to 400e) can be custom manufactured or one of a variety of commodity processors including but not limited to field-programmable grid arrays (FPGA), microprocessors, reduced instruction set computers (RISC), microcontrollers or ARM processors. The computation elements or offload processors can include combinations of computational FPGAs such as those based on Altera, Xilinx (e.g., Artix™ class or Zynq® architecture, e.g., Zynq® 7020), and/or conventional processors such as those based on Intel Atom or ARM architecture (e.g., ARM A9). For many applications, ARM processors having advanced memory handling features such as a snoop control unit (SCU) are preferred, since this can allow coherent read and write of memory. Other preferred advanced memory features can include processors that support an accelerator coherency port (ACP) that can allow for coherent supplementation of the cache through an FPGA fabric or computational element.

Each offload processor (400a to 400e) on the module 402 may run one of a variety of operating systems including but not limited to Apache or Linux. In addition, the offload processors (400a to 400e) may have access to a plurality of dedicated or shared storage methods. In this embodiment, each offload processor can connect to one or more storage units (in this embodiments, pairs of storage units 404a, 404b, 404c, 404d and 404e). Storage units (404a to 404e) can be of a variety of storage types, including but not limited to random access memory (RAM), dynamic random access memory (DRAM), sequential access memory (SAM), static random access memory (SRAM), synchronous dynamic random access memory (SDRAM), reduced latency dynamic random access memory (RLDRAM), flash memory, or other emerging memory standards such as those based on DDR4 or hybrid memory cubes (HMC).

FIG. 4-2 shows an example layout of a module (e.g., XIMM) such as that described in FIG. 4-1, as well as a connectivity diagram between the components of the module. In this example, five Xilinx™ Zynq® 7020 (416a, 416b, 416c, 416d, 416e and 416 in the connectivity diagram) programmable systems-on-a-chip (SoC) are used as computational FPGAs/offload processors. These offload processors can communicate with each other using memory-mapped input-output (MMIO) (412). The types of storage units used in this example are SDRAM (SD, one shown as 408) and RLDRAM (RLD, three shown as 406a, 406b, 406c) and an Inphi™ iMB02 memory buffer 418. Down conversion of 3.3 V to 2.5 volt is required to connect the RLDRAM (406a to 406c) with the Zynq® components. The components are connected to the offload processors and to each other via a DDR3 (414) memory bus. Advantageously, the indicated layout maximizes memory resources availability without requiring a violation of the number of pins available under the DIMM standard.

In this embodiment, one of the Zynq® computational FPGAs (416a to 416e) can act as arbiter providing a memory cache, giving an ability to have peer to peer sharing of data (via memcached or OMQ memory formalisms) between the other Zynq® computational FPGAs (416a to 416e). Traffic departing for the computational FPGAs can be controlled through memory mapped I/O. The arbiter queues session data for use, and when a computational FPGA asks for address outside of the provided session, the arbiter can be the first level of retrieval, external processing determination, and predictors set.

FIG. 4-3 shows two possible architectures for a module (e.g., XIMM) in a simulation (Xockets MAX and MIN). Xockets MIN (420a) can be used in low-end public cloud servers, containing twenty ARM cores (420b) spread across fourteen DIMM slots in a commodity server which has two Opteron x86 processors and two network interface cards (NICs) (420c). This architecture can provide a minimal benefit per Watt of power used. Xockets MAX (422a) contains eighty ARM cores (422b) across eight DIMM slots, in a server with two Opteron x86 processors and four NICs (422c). This architecture can provide a maximum benefit per Watt of power used.

FIG. 4-4 shows a representative power budget for an example of a module (e.g., XIMM) according to a particular embodiment. Each component is listed (424a, 424b, 424c, 424d) along with its power profile. Average total and total wattages are also listed (426a, 426b). In total, especially for I/O packet processing with packet sizes on the order 1 KB in size, module can have a low average power budget that is easily able to be provided by the 22 $V_{dd}$ pins per DIMM. Additionally, the expected thermal output can be handled by inexpensive conductive heat spreaders, without requiring additional convective, conductive, or thermoelectric cooling. In certain situations, digital thermometers can be implemented to dynamically reduce performance (and consequent heat generation) if needed.

Operation of one embodiment of a module 430 (e.g., XIMM) using an ARM A9 architecture is illustrated with respect to FIG. 4-5. Use of ARM A9 architecture in conjunction with an FPGA fabric and memory, in this case shown as reduced latency DRAM (RLDRAM) 438, can simplify or makes possible zero-overhead context switching, memory compression and CPI, in part by allowing hardware context switching synchronized with network queuing. In this way, there can be a one-to-one mapping between thread and queues. As illustrated, the ARM A9 architecture includes a Snoop Control Unit 432 (SCU). This unit allows one to read out and write in memory coherently. Additionally, the Accelerator Coherency Port 434 (ACP) allows for coherent supplementation of the cache throughout the FPGA 436. The RLDRAM 438 provides the auxiliary bandwidth to read and write the ping-pong cache supplement (435): Block1$ and Block2$ during packet-level meta-data processing.

The following table (Table 1) illustrates potential states that can exist in the scheduling of queues/threads to XIMM processors and memory such as illustrated in FIG. 4-5.

TABLE 1

| Queue/Thread State | HW treatment |
| --- | --- |
| Waiting for Ingress Packet | All ingress data has been processed and thread awaits further communication. |
| Waiting for MMIO | A functional call to MM hardware (such as HW encryption or transcoding) was made. |
| Waiting for Rate-limit | The thread's resource consumption exceeds limit, due to other connections idling. |
| Currently being processed | One of the ARM cores is already processing this thread, cannot schedule again. |
| Ready for Selection | The thread is ready for context selection. |

These states can help coordinate the complex synchronization between processes, network traffic, and memory-mapped hardware. When a queue is selected by a traffic manager a pipeline coordinates swapping in the desired L2 cache (440), transferring the reassembled IO data into the memory space of the executing process. In certain cases, no packets are pending in the queue, but computation is still pending to service previous packets. Once this process makes a memory reference outside of the data swapped, a scheduler can require queued data from a network interface card (NIC) to continue scheduling the thread. To provide fair queuing to a process not having data, the maximum context size is assumed as data processed. In this way, a queue must be provisioned as the greater of computational resource and network bandwidth resource, for example, each as a ratio of an 800 MHz A9 and 3 Gbps of bandwidth. Given the lopsidedness of this ratio, the ARM core is generally indicated to be worthwhile for computation having many parallel sessions (such that the hardware's prefetching of session-specific data and TCP/reassembly offloads a large portion of the CPU load) and those requiring minimal general purpose processing of data.

Essentially zero-overhead context switching is also possible using modules as disclosed in FIG. 4-5. Because per packet processing has minimum state associated with it, and represents inherent engineered parallelism, minimal memory access is needed, aside from packet buffering. On the other hand, after packet reconstruction, the entire memory state of the session can be accessed, and so can require maximal memory utility. By using the time of packet-level processing to prefetch the next hardware scheduled application-level service context in two different processing passes, the memory can always be available for prefetching. Additionally, the FPGA 436 can hold a supplemental "ping-pong" cache (435) that is read and written with every context switch, while the other is in use. As previously noted, this is enabled in part by the SCU 432, which allows one to read out and write in memory coherently, and ACP 434 for coherent supplementation of the cache throughout the FPGA 436. The RLDRAM 438 provides for read and write to the ping-pong cache supplement 435 (shown as Block1$ and Block2$) during packet-level meta-data processing. In the embodiment shown, only locally terminating queues can prompt context switching.

In operation, metadata transport code can relieve a main or host processor from tasks including fragmentation and reassembly, and checksum and other metadata services (e.g., accounting, IPSec, SSL, Overlay, etc.). As 10 data streams in and out, L1 cache 437 can be filled during packet processing. During a context switch, the lock-down portion of a translation lookaside buffer (TLB) of an L1 cache can be rewritten with the addresses corresponding to the new context. In one very particular implementation, the following four commands can be executed for the current memory space.

MRC p15,0,r0,c10,c0,0; read the lockdown register

BIC r0,r0,#1; clear preserve bit

MCR p15,0,r0,c10,c0,0; write to the lockdown register;

write to the old value to the memory mapped Block RAM

This is a small 32 cycle overhead to bear. Other TLB entries can be used by the XIMM stochastically.

Bandwidths and capacities of the memories can be precisely allocated to support context switching as well as applications such as Openflow processing, billing, accounting, and header filtering programs.

For additional performance improvements, the ACP 434 can be used not just for cache supplementation, but hardware functionality supplementation, in part by exploitation of the memory space allocation. An operand can be written to memory and the new function called, through customizing specific Open Source libraries, so putting the thread to sleep and a hardware scheduler can validate it for scheduling again once the results are ready. For example, OpenVPN uses the OpenSSL library, where the encrypt/decrypt functions 439 can be memory mapped. Large blocks are then available to be exported without delay, or consuming the L2 cache 440, using the ACP 434. Hence, a minimum number of calls are needed within the processing window of a context switch, improving overall performance.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

It is also understood that the embodiments of the invention may be practiced in the absence of an element and/or step not specifically disclosed. That is, an inventive feature of the invention may be elimination of an element.

Accordingly, while the various aspects of the particular embodiments set forth herein have been described in detail, the present invention could be subject to various changes, substitutions, and alterations without departing from the spirit and scope of the invention.

What is claimed is:

1. A method, comprising:

issuing a write command on a system memory bus by operation of a memory controller, the system memory bus including address and data lines;

receiving the write command from the system memory bus in an in-line module through an in-line module connector, an address of the write command identifying a request to at least one offload processor disposed on the in-line module;

processing at least a portion of data included with the write command with the at least one offload processor to generate processed data; and transmitting the processed data from the in-line module over the system memory bus; wherein the system memory bus is further connected to at least one processor connector configured to receive at least one host processor different from the at least one offload processor, that can access a system memory via the system memory bus, and transmitting the processed data from the in-line module over the system memory bus includes transmitting the processed data to an input/output device that is different than a host processor.

2. The method of claim 1, wherein:

receiving the write command includes processing a direct memory access (DMA) write request with an interface of the in-line module.

3. The method of claim 2, wherein:

the DMA write request is not issued by a host processor.

4. The method of claim 2, wherein:

the DMA write request is issued by a virtual switch different than a host processor.

5. The method of claim 1, wherein:

receiving the write command includes storing write data corresponding to the write command in a buffer memory mounted on the in-line module.

6. The method of claim 1, further including:

in response to predetermined conditions, storing a processing context of the at least one offload processor within the in-line module, and redirecting the at least one offload processor to process other data different from that received with the write command.

7. The method of claim 6, further including:

after processing or terminating the processing of the other data, restoring the stored processing context to the at least one offload processor.

8. The method of claim 1, wherein:

transmitting the processed data from the in-line module over the system memory bus includes responding to a read command on the system memory bus issued by the memory controller.

9. A method, comprising:

writing data to predetermined physical addresses of a system memory of a system, the address of the written data corresponding to at least one offload processor and identifying a request to the at least one offload processor;

configuring at least one processor module to include the predetermined physical addresses, the at least one processor module being physically connected to a system memory bus by a memory module connection, the system memory bus including address and data lines; and processing the write data with the at least one offload processor, the at least one offload processor being mounted on the at least one processor module; wherein the system memory includes physical addresses that include the predetermined physical addresses, and other physical addresses for storing data in the system memory, including by a main processor of the system, the main processor being different from the at least one offload processor and not mounted on the processor module.

10. The method of claim 9, wherein:

writing data includes servicing a direct memory access (DMA) request at the at least one processor module.

11. The method of claim 10, wherein:

the main processor is coupled to the system memory bus by a memory controller; and the DMA request is initiated by device other than the main processor.

12. The method of claim 9, further including:

the at least one processor module includes a plurality of hardware functions, including the at least one offload processor, the hardware functions being mapped to particular physical addresses of the system memory; and scheduling operations of the hardware functions according to the write addresses received by the at least one processor module.

13. The method of claim 9 wherein:

scheduling operations of the multiple hardware functions includes storing a current context of the at least one offload processor, and processing other data with the at least one offload processor, the other data being different than the write data.

14. The method of claim 9, further including:

processing the write data with the at least one offload processor generates processed data; and outputting the processed data from the at least processor module by reading data from the predetermined physical addresses of the system memory.

\* \* \* \* \*